United States Patent
Slobodyanyuk et al.

(10) Patent No.: US 10,552,983 B1
(45) Date of Patent: Feb. 4, 2020

(54) CAMERA CALIBRATION

(71) Applicant: QUALCOMM Incorporated, San Diego, CA (US)

(72) Inventors: Vladimir Slobodyanyuk, San Diego, CA (US); Bardia Behabadi, San Diego, CA (US); Gerhard Reitmayr, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/109,972

(22) Filed: Aug. 23, 2018

(51) Int. Cl.
*G06T 7/80* (2017.01)
*H04N 17/00* (2006.01)

(52) U.S. Cl.
CPC ............ *G06T 7/80* (2017.01); *H04N 17/002* (2013.01)

(58) Field of Classification Search
CPC .............................. G06T 7/80; H04N 17/002
See application file for complete search history.

(56) References Cited

U.S. PATENT DOCUMENTS

2011/0194851 A1\* 8/2011 Hjelmstrom ........... G03B 7/095
396/242
2016/0300354 A1\* 10/2016 Fetzer ................ G06K 9/00664

\* cited by examiner

*Primary Examiner* — Michael E Teitelbaum
(74) *Attorney, Agent, or Firm* — QUALCOMM Incorporated

(57) ABSTRACT

Methods, systems, and devices for calibrating a camera device are described. The camera device may capture a first set of images of a physical environment and a second set of images of the physical environment having at least one illuminated reference point. The camera device may use a multi-dimensional target for calibration that may be formed by a quantity of illuminated reference points. That is, the illuminated reference points may be part of the multi-dimensional target. The camera device may determine a location of at least one illuminated reference point in an image of the second set based on an image of the first set and the image of the second set, and determine an association between the location of the at least one illuminated reference point in the image of the second set to a physical location of the illuminated reference point in the physical environment. As a result, the camera device may be calibrated.

18 Claims, 10 Drawing Sheets

CAMERA CALIBRATION

BACKGROUND

A camera system may be deployed to provide various types of functional features. In an example related to virtual reality applications, a camera system may support a fully immersive virtual reality experience, a non-immersive virtual reality experience, or a collaborative virtual reality experience. In another example, a camera system may be combined with a computer vision-based driving assistance system of an automotive vehicle to support autonomous self-driving functions. As one example, a camera system may be integrated with the automotive vehicle to perform various analysis such as real-time road monitoring and obstacle detection, etc.

Each camera in a camera-based system may have to be calibrated before being deployed for a certain application to ensure accuracy. Some camera calibration techniques, however, may be substandard and pose challenges. As a result, these calibration techniques may be deficient and ineffective as well as affecting user-experience by necessitating human intervention to perform the calibration.

SUMMARY

The described techniques relate to improved methods, systems, devices, and apparatuses that support camera calibration. Before deployment, a calibration of a camera device, including derivation of intrinsic and/or extrinsic calibration parameters, may be necessary for the camera device to operate both effectively and efficiently.

As part of the calibration, the camera device may capture a first set of images of a physical environment and a second set of images of the physical environment having an illuminated reference point. The camera device may determine a location of the illuminated reference point in an image of the second set of images based on at least one image of the first set of images and at least one image of the second set of images, and determine an association between the location of the illuminated reference point in the image of the second set of images to a physical location of the illuminated reference point in the physical environment. The determinations may include determining a set of intrinsic and/or extrinsic parameter values of the camera device, which may be used by the camera device and/or another device to calibrate the camera.

A method for calibrating a camera device. The method may include capturing, by the camera device, a first set of images of a physical environment, capturing, by the camera device, a second set of images of the physical environment having an illuminated reference point, determining a location of the illuminated reference point in an image of the second set of images based on an image of the first set of images and the image of the second set of images, determining an association between the location of the illuminated reference point in the image of the second set of images to a physical location of the illuminated reference point in the physical environment, and calibrating the camera device based on the association.

An apparatus is described. The apparatus may include a processor, memory in electronic communication with the processor, and instructions stored in the memory. The instructions may be executable by the processor to cause the apparatus to capture, by the apparatus, a first set of images of a physical environment, capture, by the apparatus, a second set of images of the physical environment having an illuminated reference point, determine a location of the illuminated reference point in an image of the second set of images based on an image of the first set of images and the image of the second set of images, determine an association between the location of the illuminated reference point in the image of the second set of images to a physical location of the illuminated reference point in the physical environment, and calibrate the apparatus based on the association.

Another apparatus is described. The apparatus may include means for capturing, by the apparatus, a first set of images of a physical environment, capturing, by the apparatus, a second set of images of the physical environment having an illuminated reference point, determining a location of the illuminated reference point in an image of the second set of images based on an image of the first set of images and the image of the second set of images, determining an association between the location of the illuminated reference point in the image of the second set of images to a physical location of the illuminated reference point in the physical environment, and calibrating the camera device based on the association.

A non-transitory computer-readable medium storing code for calibrating a camera device is described. The code may include instructions executable by a processor to capture, by the camera device, a first set of images of a physical environment, capture, by the camera device, a second set of images of the physical environment having an illuminated reference point, determine a location of the illuminated reference point in an image of the second set of images based on an image of the first set of images and the image of the second set of images, determine an association between the location of the illuminated reference point in the image of the second set of images to a physical location of the illuminated reference point in the physical environment, and calibrate the camera device based on the association.

Some examples of the method, apparatuses, and non-transitory computer-readable medium described herein may further include operations, features, means, or instructions for determining a set of intrinsic parameter values of the camera device based on the first set of images of the physical environment and the second set of images of the physical environment having the illuminated reference point, where calibrating the camera device may be based on the set of intrinsic parameter values.

In some examples of the method, apparatuses, and non-transitory computer-readable medium described herein, the set of intrinsic parameter values comprises at least one of a focal length associated with the camera device, a principal point associated with the camera device, a skew coefficient associated with the camera device, or a distortion associated with the camera device.

Some examples of the method, apparatuses, and non-transitory computer-readable medium described herein may further include operations, features, means, or instructions for determining a set of extrinsic parameter values of the camera device based on the first set of images of the physical environment and the second set of images of the physical environment having the illuminated reference point, where calibrating the camera device may be based on the set of extrinsic parameter values.

In some examples of the method, apparatuses, and non-transitory computer-readable medium described herein, the set of extrinsic parameter values comprises at least one of a rotation associated with a reference frame for the camera device, or a translation associated with the reference frame for the camera device.

In some examples of the method, apparatuses, and non-transitory computer-readable medium described herein, the illuminated reference point is a self-emitting light source.

Some examples of the method, apparatuses, and non-transitory computer-readable medium described herein may further include operations, features, means, or instructions for determining a difference between the image of the first set of images and the image of the second set of images having the illuminated reference point, where determining the location of the illuminated reference point in the image of the second set of images may be based on the difference.

Some examples of the method, apparatuses, and non-transitory computer-readable medium described herein may further include operations, features, means, or instructions for receiving configuration information during a calibration procedure, where the configuration information includes at least one of: physical location information of a quantity of illuminated reference points in the physical environment and an illumination pattern of the quantity of illuminated reference points in the physical environment, or the quantity of illuminated reference points including the illuminated reference point, where capturing the first set of images and the second set of images may be based on the configuration information.

In some examples of the method, apparatuses, and non-transitory computer-readable medium described herein, the quantity of illuminated reference points in the physical environment form a multi-dimensional target, wherein calibrating the camera device is based at least in part on the multi-dimensional target formed by the quantity of illuminated reference points in the physical environment comprising the illuminated reference point.

Some examples of the method, apparatuses, and non-transitory computer-readable medium described herein may further include operations, features, means, or instructions for identifying the physical location of the illuminated reference point in the physical environment based on the configuration information and comparing the location of the illuminated reference point in the image of the second set of images to the identified physical location of the illuminated reference point in the physical environment, where determining the association between the location of the illuminated reference point in the image of the second set of images to the physical location of the illuminated reference point in the physical environment may be based on the comparing.

Some examples of the method, apparatuses, and non-transitory computer-readable medium described herein may further include operations, features, means, or instructions for identifying the illumination pattern associated with the illuminated reference point and a quantity of other illuminated reference points in the physical environment based on the configuration information, the illuminated reference and the quantity of other illuminated reference points having varying depths and positions within the physical environment relative to the camera device, where capturing the first set of images and the second set of images may be based on the illumination pattern.

Some examples of the method, apparatuses, and non-transitory computer-readable medium described herein may further include operations, features, means, or instructions for identifying a first time associated with an inactive state of the illuminated reference point and one or more of the other illuminated reference points in the physical environment based on the illumination pattern, where capturing the first set of images of the physical environment includes capturing the first set of images during the first time.

Some examples of the method, apparatuses, and non-transitory computer-readable medium described herein may further include operations, features, means, or instructions for identifying a second time associated with an active state of the illuminated reference point and one or more of the other illuminated reference points in the physical environment based on the illumination pattern, where capturing the second set of images of the physical environment includes capturing the second set of images during the second time different from the first time.

Some examples of the method, apparatuses, and non-transitory computer-readable medium described herein may further include operations, features, means, or instructions for receiving, from a second camera device, a third set of images of the physical environment and receiving, from the second camera device, a fourth set of images of the physical environment having the illuminated reference point, where an orientation of the second camera device within the physical environment and relative to the illuminated reference point may be different from an orientation of the camera device within the physical environment and relative to the illuminated reference point; and where calibrating the camera device may be based on the third set of images and the fourth set of images.

Some examples of the method, apparatuses, and non-transitory computer-readable medium described herein may further include operations, features, means, or instructions for determining a difference between an image of the third set of images and an image of the fourth set of images having the illuminated reference point, determining a location of the illuminated reference point in the image of the fourth set of images based on the difference and determining an association between the location of the illuminated reference point in the image of the second set of images and the location of the illuminated reference point in the image of the fourth set of images to the physical location of the illuminated reference point in the physical environment, where calibrating the camera device may be based on the association.

DETAILED DESCRIPTION

Figure 1:
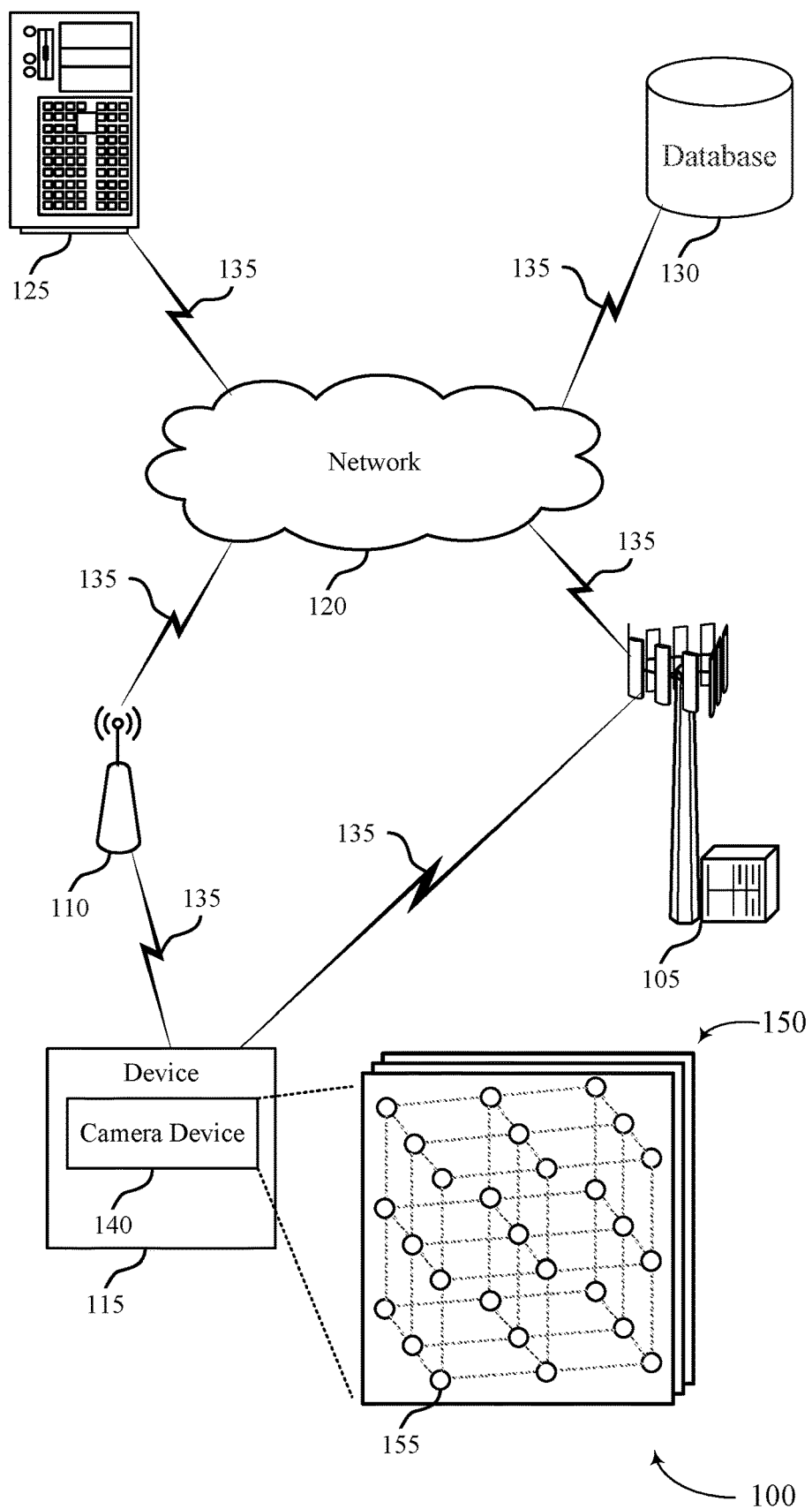
FIG. 1 illustrates an example of a system for calibrating a camera device that supports camera calibration in accordance with aspects of the present disclosure.

A camera device may be a component to capture aspects of a physical environment—for various applications (e.g., a computer vision-based driving assistance system, fully immersive virtual reality experience, a non-immersive virtual reality experience, or a collaborative virtual reality experience). Before deployment or as part of a set up process, a calibration of the camera device, including derivation of intrinsic and/or extrinsic calibration parameters, may be necessary for the camera device to operate both effectively and efficiently. As part of the calibration, a multi-dimensional calibration target with a known geometric pattern may be included within the physical environment for the camera device to sense (e.g., determine the pattern) and extract intrinsic and/or extrinsic parameter values from captured images of the calibration target.

The multi-dimensional calibration target may be two-dimensional (2D), three-dimensional (3D), fourth dimensional (4D), etc. Some examples of a calibration target may be 2D having a known geometric pattern (e.g., checker board, Aruco codes). The 3D calibration target may support enhanced calibration for a camera device compared to 2D calibration targets. For example, a 3D calibration target may support varying depths and positions within a physical environment (e.g., x, y, and z coordination), while the 2D calibration target only support positions within the physical environment (e.g., x and y coordination). The 3D calibration target may be realized by using a number of reference points within a physical environment that may be illuminated (or created) via a number of self-emitting light sources. That is, the reference points themselves may form the multi-dimensional calibration target and be the source of the emitting light.

For example, a reference point may be a light emitting diode (LED). In addition, by having a multi-dimensional calibration target configured by a number of reference points within a physical environment that may be illuminated (or created) via a number of self-emitting light sources, may allow the multi-dimensional calibration target to configure varying depths and positions. As such, when calibrating the camera device, its position may be static and may capture images of the target, while the reference points may provide a calibration target having vary depths and positions based on an illumination pattern.

The location (e.g., coordinates) of the reference points within the physical environment may be predetermined (known) to the camera device. As part of the calibration, the reference points may be triggered in a predefined pattern (e.g., sequentially, or non-sequentially) and corresponding images may be captured by the camera device. The camera device may determine the location of the illuminated reference points in the captured images (e.g., using a computer vision technique) and determine one or more of the intrinsic and/or extrinsic parameter values.

For example, the camera device may determine a difference between two images captured in consecutive sequence (e.g., $I_1$-$I_2$) or non-consecutive sequence (e.g., $I_1$-$I_4$) to determine the intrinsic and/or extrinsic parameter values, which the camera device may use to calibrate itself (e.g., a camera of the camera device). As such, intrinsic and/or extrinsic parameter values can be determined by capturing a series of images of progression of LEDs and determining parameters (e.g., locations) based on observed relations between object points of LEDs as known in real world coordinates compared to image points in images captured with the camera device (e.g., an uncalibrated camera). Additionally, or alternatively, the calibration can be enhanced by disposing multiple LEDs at different depths in the same observed location from the camera device (e.g., stacked LEDs in different layers at same 2D point).

Aspects of the disclosure are initially described in the context of a wireless communications system. Aspects of the disclosure are further illustrated by and described with reference to multi-dimensional calibration targets and process flows. Aspects of the disclosure are further illustrated by and described with reference to apparatus diagrams, system diagrams, and flowcharts that relate to camera calibration.

FIG. 1 illustrates an example of a system 100 that supports camera calibration in accordance with aspects of the present disclosure. The system 100 may include a base station 105, an access point 110, a device 115, a server 125, and a database 130. The base station 105, the access point 110, the device 115, the server 125, and the database 130 may communicate with each other via network 120 using wireless communications links 135.

The base station 105 may wirelessly communicate with the device 115 via one or more base station antennas. Base station 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The device 115 described herein may be able to communicate with various types of base stations and network equipment including macro eNBs, small cell eNBs, gNBs, relay base stations, and the like. The access point 110 may be configured to provide wireless communications for the device 115 over a relatively smaller area compared to the base station 105.

The device 115 may include a camera device 140. The camera device 140 may be a standalone camera, a digital camera, a stereo camera, and/or the like that may be integrated with the device 115. The camera device 140 may be part of a camera system that can capture an image of a physical environment including a multi-dimensional calibration target. The camera device 140 may have an aperture between the multi-dimensional calibration target and a photographic film or sensor (e.g., a charge coupled device (CCD) sensor or a complementary metal-oxide semiconductor (CMOS) sensor) of the camera device 140.

The camera device 140 may capture a set of images 150 of a physical environment (e.g., a multi-dimensional space) having a number of reference points 155 disposed within the environment. The reference points 155 may define a multi-dimensional calibration target (e.g., 2D, 3D), which may be used by the camera device 140 for calibration, including determining a set of intrinsic parameter values and extrinsic parameter values. Thereby, the reference points 155 may support and have varying depths and positions within the physical environment (e.g., x, y, and z coordination). The reference points 155 may be illuminated (or created) via a number of self-emitting light sources. That is, the reference points 155 themselves may be the source of the emitting light. For example, a reference point 155 may be an LED. Because the reference points 155 are capable of emitting light, every point on the film or sensor of the camera device 140 may be influenced by light rays emitted from the reference points 155. Due to the aperture, a limited number of these rays of light originating from the reference points 155 may pass through the aperture and hit the film or sensor of the camera device 140. As a result, the camera device 140 may establish a mapping between reference points 155 and the film or sensor of the camera device 140. Therein, the film or the sensor becomes exposed by an image of the reference points 155.

The film may be referred to herein as the image or retinal plane, and the aperture of the camera device 140 may be referred to as the pinhole O or center of the camera device 140. The distance between the image plane and the pinhole O may be referred to as the focal length f of the camera device 140. As part of the calibration, the camera device 140 may determine a mapping from a point (e.g., reference point 155) in the physical environment (e.g., world reference frame) to a camera coordinate system as follows:

$$P = [xyz]^T \quad (1)$$

where P is a point (e.g., reference point 155) in the physical environment visible to the camera device 140, and x, y, and z are the coordinates of the point transposed. Equation (1) may be used for mapping a multi-dimensional calibration target in the physical environment to a camera coordinate system. P may be projected onto the camera coordinate system (e.g., image plane) resulting in:

$$P' = [x'y']^T = \left[ f\frac{x}{z} f\frac{y}{z} \right]^T \quad (2)$$

where f is the focal length of the camera device 140. In some cases, the camera device 140 may be configured with a lens that may allow rays of light from the reference points 155 to be refracted by the lens such that they converge to a single point P' in the camera coordinate system (i.e., image plane). The lens may also focus all light rays from the reference points 155 to the focal point f.

Equations (1) and (2) cover a point P (e.g., a reference point 155) in a physical environment (e.g., 3D space) that can be mapped (or projected) into a 2D point P' in the camera coordinate system (i.e., image plane). This mapping (e.g., R3→R2) may be referred to as a projective transformation. In some cases, the reference points 155 captured in the images may be in a different reference system than those in the image plane. Second, the captured images may be divided into discrete pixels, whereas points in the image plane may be continuous. To account for these differences, the camera device 140 may perform a number of additional transformations allowing the camera device 140 to map any reference point 155 from the physical environment to pixel coordinates.

Image coordinates may be associated with an origin C' at an image center where an axis (e.g., k axis) intersects the image plane. Alternatively, images may have their own origin (e.g., at a lower-left corner of the image). As a result, a reference point 155 in the image plane and the same reference point 155 in the image may by offset by a translation vector $[c_x \, c_y]^T$. To account for the translation vector, mapping by the camera device 140 from a point (e.g., reference point 155) in the physical environment to a camera coordinate system becomes as follows:

$$P = \left[\frac{x'}{y'}\right]^T = \begin{bmatrix} f\frac{x}{z} + c_x \\ f\frac{y}{z} + c_y \end{bmatrix} \quad (3)$$

Because the reference points 155 in the captured images are expressed in pixels, while the reference points 155 in the image plane are represented in physical measurements (e.g., centimeters), the camera device 140 may introduce two new parameters k and l. These parameters may correspond to the change of units in the two axes of the image plane. As a result, the mapping by the camera device 140 from a point (e.g., reference point 155) in the physical environment to a camera coordinate system becomes as follows:

$$P = \left[\frac{x'}{y'}\right]^T = \begin{bmatrix} f\frac{x}{z} + c_x \\ f\frac{y}{z} + c_y \end{bmatrix} = \begin{bmatrix} \alpha\frac{x}{z} + c_x \\ \beta\frac{y}{z} + c_y \end{bmatrix} \quad (4)$$

Following the above adjustment to the mapping, the camera device 140 may further adjust the expression above due to the projection (e.g., from physical space to image plane) not being a linear transformation.

To account for the nonlinearity of the transformation of Equation (4), the camera device 140 may change the coordinate system. For example, the coordinate system may be such that any P'=(x'y') becomes (x', y', 1). Similarly, any point P=(x, y, z) becomes (x, y, z, 1). By applying homogeneous coordinate system, the camera device 140 may assign the camera coordinate system to be as follows:

$$P'_h = \begin{bmatrix} \alpha x + c_x z \\ \beta y + c_y z \\ z \end{bmatrix} = \begin{bmatrix} \alpha & 0 & c_x & 0 \\ 0 & \beta & c_y & 0 \\ 0 & 0 & 1 & 0 \end{bmatrix} \begin{bmatrix} x \\ y \\ z \\ 1 \end{bmatrix} = \begin{bmatrix} \alpha & 0 & c_x & 0 \\ 0 & \beta & c_y & 0 \\ 0 & 0 & 1 & 0 \end{bmatrix} P_h \quad (5)$$

Equation (5) may be further simplified, by assuming that any point P or P' will be in the homogenous coordinates, as follows:

$$P = \begin{bmatrix} x' \\ y' \\ z \end{bmatrix} = \begin{bmatrix} \alpha & 0 & c_x & 0 \\ 0 & \beta & c_y & 0 \\ 0 & 0 & 1 & 0 \end{bmatrix} \begin{bmatrix} x \\ y \\ z \\ 1 \end{bmatrix} = \begin{bmatrix} \alpha & 0 & c_x & 0 \\ 0 & \beta & c_y & 0 \\ 0 & 0 & 1 & 0 \end{bmatrix} P = MP \quad (6)$$

Equation (6) may be further decomposed as follows:

$$P' = MP = \begin{bmatrix} \alpha & 0 & c_x \\ 0 & \beta & c_y \\ 0 & 0 & 1 \end{bmatrix} [I\,0] P = K[I\,0] P \quad (7)$$

The matrix K may be referred to herein as the camera matrix, which includes the set of intrinsic parameter values. The camera device 140 may further manipulate the camera matrix to account for extrinsic parameter values, which include skewness and distortion. An image captured by the camera device 140 may be skewed when the camera coordinate system is skewed. For example, angle between the two axes are slightly greater or lesser than 90 degrees. The camera matrix accounting for extrinsic parameter values may be defined as follows:

$$K = \begin{bmatrix} x' \\ y' \\ z \end{bmatrix} = \begin{bmatrix} \alpha & -\alpha\cos\theta & c_x \\ 0 & \frac{\beta}{\sin\theta} & c_y \\ 0 & 0 & 1 \end{bmatrix} \quad (8)$$

As a result, the camera matrix given by Equation (8) may have five degrees of freedom: two for focal length, two for offset, and one for skewness.

In some cases, to accommodate for a different coordinate system (e.g., other than a mapping between a point P in a physical environment coordinate system to a point P' in a camera coordinate system), the camera device 140 may include an additional transformation that relates points from the physical environment coordinate system to the camera coordinate system. The camera device 140 may account for the different coordinate system as follows:

$$P = \begin{bmatrix} R & T \\ 0 & 1 \end{bmatrix} P_w = K[RT]P_w = MP_w \qquad (9)$$

where R is a rotation matrix and T is a translation vector. Therein, for a reference point 155 in the physical environment coordinate system $P_w$, the camera coordinate system may be determined according to Equation (9). The projection matrix M includes two types of parameters the intrinsic parameters and the extrinsic parameters. As such, in an example, a 3×4 projection matrix M may have 11 degrees of freedom: five from the intrinsic camera matrix, three from extrinsic rotation, and three from extrinsic translation. To determine the transformation from the real-world into images coordinate system requires the camera device 140 to know at least some of the camera's intrinsic and/or extrinsic parameters, which may have unavailable to the camera device 140 beforehand. The camera device 140 may, however, determine the intrinsic and/or extrinsic parameters based on capturing a set of images 150 of a physical environment (e.g., a multi-dimensional space) having a number of reference points 155 disposed within the environment, and using Equations (1) through (9). Equations (1) through (9) and the mapping techniques may be one example way of determining the intrinsic and/or extrinsic parameters (e.g., one implementation), and other techniques are contemplated and are within the scope of this disclosure.

As part of the calibration of the camera device 140, the device 115 may receive configuration information during the calibration procedure, for example, from another device 115, user-input, or the server 125, or a combination thereof. The configuration information may include physical location information (e.g., coordinate data) of the reference points 155 in the physical environment and an illumination pattern of the reference points 155 in the physical environment. The illumination pattern may provide an indication (e.g., illuminance schedule) of the reference points 155. In an example, the camera device 140 may capture the set of images 150 according to the illumination pattern of the reference points 155.

The camera device 140 may capture at least two images of two sets of images for calibrating the camera device 140, where one image or set is a control set and the other image or set is a variable set. In an example when the multi-dimensional calibration target is a 2D calibration target, the camera device 140 may capture multiple images of the 2D calibration target from different positions to determine the set of intrinsic parameter values and extrinsic parameter values for the camera device 140. Alternatively, in another example when the multi-dimensional calibration target is a 3D calibration target, the camera device 140 may capture fewer images compared to the 2D calibration target. In some cases, 3D calibration targets may yield improved calibration results (e.g., accuracy and eliminating the need to capture multiple images) compared to 2D calibration targets. For example, when the camera device 140 mobility is limited (like when the camera is already installed as part of the device 115), the 2D calibration target location may need to be adjusted, which may be a cumbersome process requiring human intervention. In another example, the multi-dimensional calibration target described herein may support autonomous camera calibration. In further examples, the camera device 140 and multi-dimensional calibration target described herein (e.g., reference points 155) may eliminate requiring human intervention for post processing (e.g., as part of the camera calibration) for selecting sets of images for camera calibration. For example, the camera device 140 may use the illumination pattern to schedule to select and separate the captured images 150 for camera calibration processing.

In some cases, the camera device 140 may use the illumination pattern to schedule a capturing of the physical environment to compile the control image and the variable image. For example, the camera device 140 may capture a first set of images at a first time when the reference points 155 are in an inactive state (e.g., not emitting light) and a second set of images at a second time when at least one of the reference points 155 is in an active state (e.g., emitting light). The camera device 140 may use the two sets of captured images to determine a set of intrinsic parameter values and extrinsic parameter values for the camera device 140. For example, the camera device 140 may determine at least one of a focal length associated with the camera device 140, a principal point associated with the camera device 140, a skew coefficient associated with the camera device 140, or a distortion associated with the camera device 140 based on the two sets of captured images. Additionally, or alternatively, the camera device 140 may determine a rotation associated with a reference frame for the camera device 140, or a translation associated with the reference frame for the camera device 140.

In some cases, the device 115 may coordinate the illumination of the reference points 155, for example, the device 115 may receive a predetermined illumination pattern sequence (e.g., from an administrator, user). As such, one or more reference points 155 may illuminate based on receiving a signal (e.g., instructions, control signal) from the device 115. Alternatively, the one or more reference points 155 may illuminate based on the illumination pattern (e.g., schedule). That is during the calibration, the reference points 155 may be triggered ON in a predefined pattern (e.g., the reference points 155 are illuminated sequentially (e.g., one-by-one)), and the set of images 150 are captured.

The camera device 140 may determine the set of intrinsic parameter values and extrinsic parameter values by determining a location of an illuminated reference point (e.g., reference point 155) in an image of the second set of images based on an image of the first set of images and the image of the second set of images. For example, the camera device 140 may determine a difference such as, red-green-blue (RGB) values, luminance and chrominance values, etc., between the image of the first set of images and the image of the second set of images having the illuminated reference point.

The camera device 140 may establish a number of correspondences (e.g., associations) between the reference points (e.g., object points) associated with the multi-dimensional calibration target, and image points in the captured images. For example, upon determining the location of the illuminated reference point in the image, the camera device 140 may determine an association between the location of the illuminated reference point in the image of the second set of images to a physical location of the illuminated reference point in the physical environment. Using the association, the camera device 140 may determine the set of intrinsic parameter values and/or extrinsic parameter values, and calibrate. Upon calibrating the camera device 140, the device 115 may be deployed for certain applications. In some cases, the device 115 may support multiple camera device cross-calibration, as described in FIG. 3.

The camera calibration techniques described herein and the adaptive multi-dimensional calibration target may support autonomous or semi-autonomous functions. Thereby, a position of the multi-dimensional calibration target may be established with a high degree of accuracy in the physical (local) environment, allowing for extracting not only intrinsic calibration parameters, but also extrinsic calibration parameters.

In some examples, the device 115 may be stationary and/or mobile. In some examples, the device 115 may include an automotive vehicle, an aerial vehicle, such as an unmanned aerial vehicle (UAV), ground vehicles and robots (e.g., autonomous or semi-autonomous cars, vacuum robots, search and rescue robots, bomb detection and disarming robots, etc.), water-based vehicles (i.e., surface watercraft and submarines); space-based vehicles (e.g., a spacecraft or space probe), and/or some combination thereof. Various embodiments may be particularly useful for the device 115 configured to as part of a computer vision-based driving assistance system, fully immersive virtual reality experience, a non-immersive virtual reality experience, or a collaborative virtual reality experience, etc., following a camera calibration of the camera device 140.

The device 115 may, additionally or alternatively, include or be referred to by those skilled in the art as a user equipment (UE), a user device, a cellular phone, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the device 115 may also be able to communicate directly with another device (e.g., using a peer-to-peer (P2P) or device-to-device (D2D) protocol).

The device 115 may include memory, a processor, an output, and a communication module. The processor may be a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), and/or the like. The processor may be configured to process data (e.g., images, calibration target information, intrinsic parameter values, extrinsic parameter values, illumination pattern information) from and/or write data (e.g., images, calibration target information, intrinsic parameter values, extrinsic parameter values, illumination pattern information) to the memory. The processor may also be configured to provide image enhancements, image restoration, image analysis, image compression, and image synthesis. For example, the device 115 may support camera calibration, according to the techniques described herein.

The memory may be, for example, a random-access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some examples, devices 115 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, camera calibration.

The network 120 that may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G) for example), etc. Network 120 may include the Internet.

The server 125 may include any combination of a data server, a cloud server, a server associated with an automation service provider, proxy server, mail server, web server, application server, a map server, a road assistance server, database server, communications server, home server, mobile server, or any combination thereof. The server 125 may also transmit to the device 115 a variety of information, such as instructions or commands (e.g., display data, refresh pixel region information) relevant to refresh pixel region 145 determination for video coding. The database 130 may store data that may include instructions or commands (e.g., images, calibration target information, intrinsic parameter values, extrinsic parameter values, illumination pattern information) relevant to a reference point associated with a multi-dimensional calibration target. The device 115 may retrieve the stored data from the database 130 via the base station 105 and/or the access point 110.

The wireless communications links 135 shown in the system 100 may include uplink transmissions from the device 115 to the base station 105, the access point 110, or the server 125, and/or downlink transmissions, from the base station 105, the access point 110, the server 125, and/or the database 130 to the device 115. The downlink transmissions may also be called forward link transmissions while the uplink transmissions may also be called reverse link transmissions. The wireless communications links 135 may transmit bidirectional communications and/or unidirectional communications. Wireless communications links 135 may include one or more connections, including but not limited to, 345 MHz, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

Figure 2A:
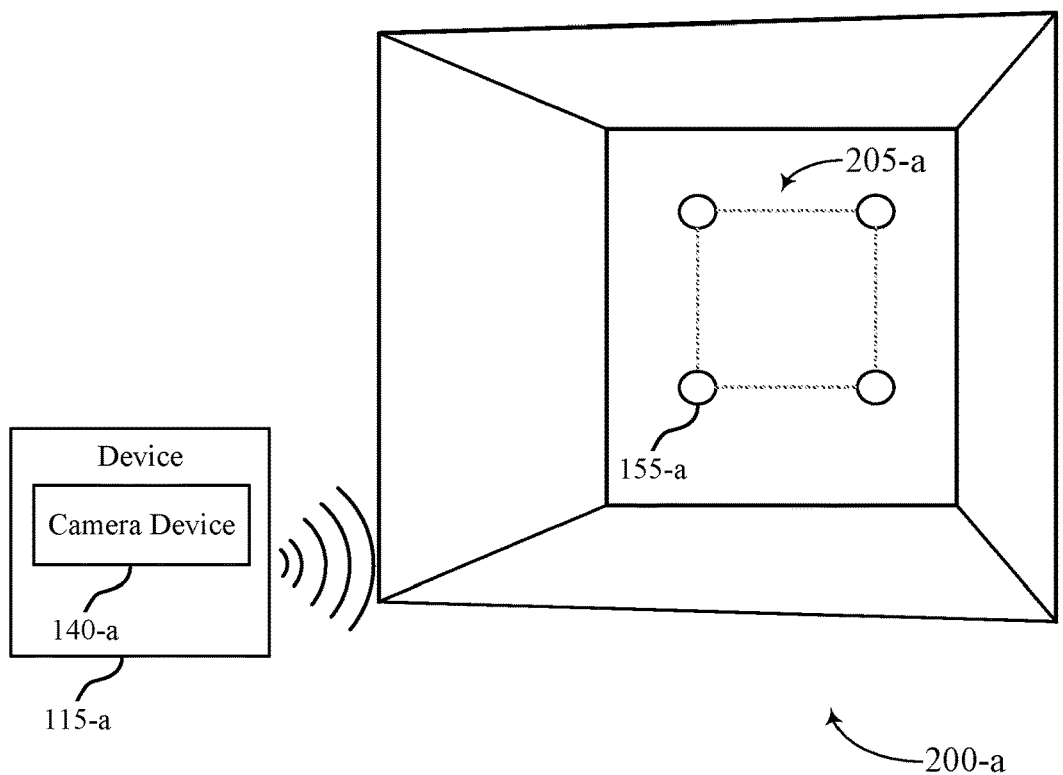
FIGS. 2A and 2B illustrate examples of physical environment having multi-dimensional calibration targets that support camera calibration in accordance with aspects of the present disclosure.
Figure 2B:
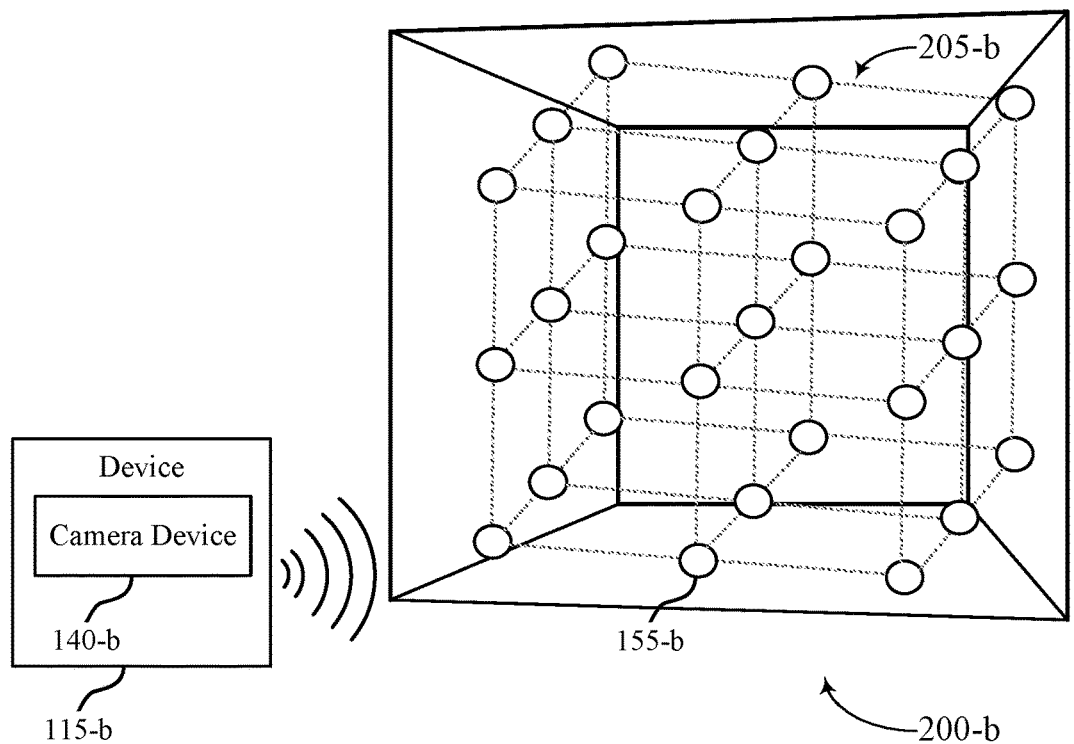

FIGS. 2A and 2B illustrate examples of physical environment having multi-dimensional calibration targets that support camera calibration in accordance with aspects of the present disclosure. The physical environments having multi-dimensional calibration targets, illustrated in FIGS. 2A and 2B, may implement aspects of the system 100. For example, the physical environments 200-*a* associated with FIG. 2A may have a 2D calibration target 205-*a*, while the physical environments 200-*b* associated with FIG. 2B may have a 3D calibration target 205-*b*.

With reference to FIG. 2A, a device 115-*a* may include a camera device 140-*a*, which may be examples of the corresponding devices described with reference to FIG. 1. The physical environment 200-*a* may be a calibration room (e.g., a room having 3D physical dimensions) and have reference points 155-*a* (e.g., LEDs) installed at one or more locations within the physical environment 200-*a*.

For example, the physical environment 200-*a* may have four reference points 155-*a* installed. Because the reference points 155-*a* form a 2D calibration target 205-*a*, these reference points 155-*a* may be mapped according to at least a two Cartesian coordinate system (e.g., x and y coordinates). The device 115-*a* may be positioned within the physical environment 200-*a*, and the camera device 140-*a* may capture an image or a set of images of the reference points 155-*a* (e.g., LEDs) installed at one or more locations within the physical environment 200-*a*, as described herein to perform camera calibration for the camera device 140-*a*.

With reference to FIG. 2B, a device 115-*b* may include a camera device 140-*b*, which may be examples of the corresponding devices described with reference to FIG. 1. The physical environment 200-*b* may also be a calibration room (e.g., a room having 3D physical dimensions) and have reference points 155-*b* (e.g., LEDs) installed at one or more locations within the physical environment 200-*b*.

For example, the physical environment 200-*b* may have a quantity of reference points 155-*b* installed. Because the reference points 155-*b* form a 3D calibration target 205-*b*, these reference points 155-*b* may be mapped according to at least a three Cartesian coordinate system (e.g., x, y, and z coordinates). The reference points 155-*b* may be triggered according to a binary pattern (e.g., to minimize number of captured images). To realize the 3D calibration target 205-*b*, a transparent construction (e.g., a grid like frame, a plexiglass sheet) may be installed and have the reference points 155-*b* installed thereof, and multiple transparent constructions may be arranged to create several layers of LEDs. For example, a first layer may have a number of reference points 155-*b* installed thereon, a second layer may be positioned in front or behind the first layer and include a number of reference points 155-*b* installed thereon, etc., The device 115-*b* may be positioned within the physical environment 200-*b*. In some examples, the device 115-*b* may be within a predetermined distance from the 3D calibration target 205-*b*. For example, the predetermined distance may be 20% of a total distance from the camera device 140-*b* of the device 115-*b* to the a first layer of the 3D calibration target 205-*b*. The camera device 140-*b* may capture an image or a set of images of the reference points 155-*a* (e.g., LEDs) installed at one or more locations within the physical environment 200-*b* and perform analysis of the captured image or set of images, as described herein to perform camera calibration for the camera device 140-*b*.

Figure 3A:
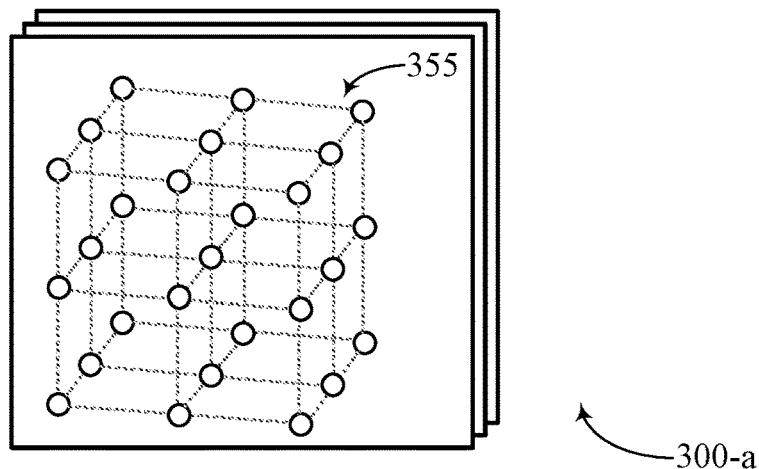
FIGS. 3A through 3C illustrate examples of diagrams that support camera calibration in accordance with aspects of the present disclosure.
Figure 3B:
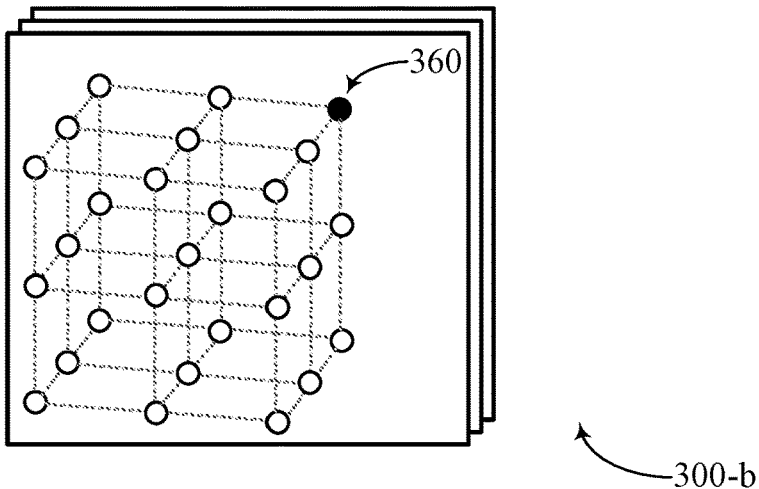
Figure 3C:
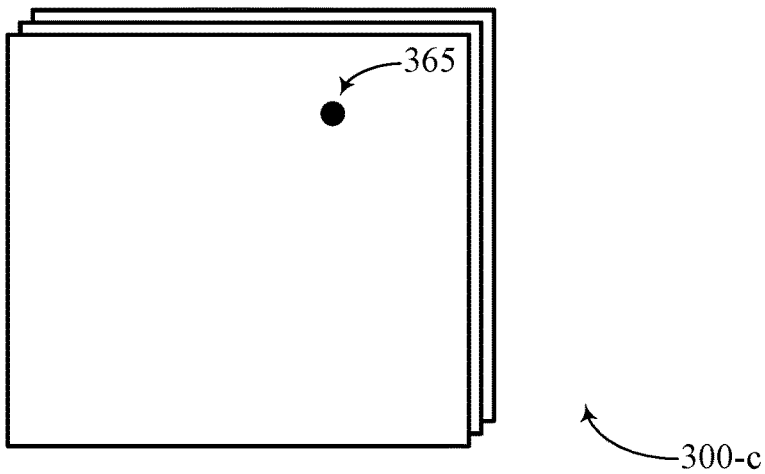

FIGS. 3A through 3C illustrate examples of diagrams that support camera calibration in accordance with aspects of the present disclosure. The diagrams illustrated in FIGS. 3A through 3C may implement aspects of the system 100. For example, a first set of captured images 300-*a* associated with FIG. 3A may have a 3D calibration target having a number of reference points 355 that may be unilluminated, while a second set of captured images 300-*b* associated with FIG. 3B may have a 3D calibration target having at least one reference point 360 that may be illuminated, and a third set of images 300-*c* may be a difference between the first set of images 300-*a* and the second set of images 300-*b* having the at least one illuminated reference point 360.

A device as described herein may determine (e.g., using a computer vision technique) the location of the illuminated reference point(s) 360, for example, by one or more comparisons (e.g., determining a difference between the first set of images 300-*a* and the second set of images 300-*b* having the illuminated reference points 360). The difference of the images taken before and after one or more reference points 355/360 are illuminated may yield bright spot 365 of the source of light on the third set of images 300-*c*.

The camera device 140, with reference to FIG. 1, may use the bright spot 365 to determine a set of intrinsic and/or extrinsic parameter values of the camera device 140 for camera calibration (e.g., a focal length associated with the camera device 140, a principal point associated with the camera device 140, a skew coefficient associated with the camera device, or a distortion associated with the camera device 140).

Figure 4:
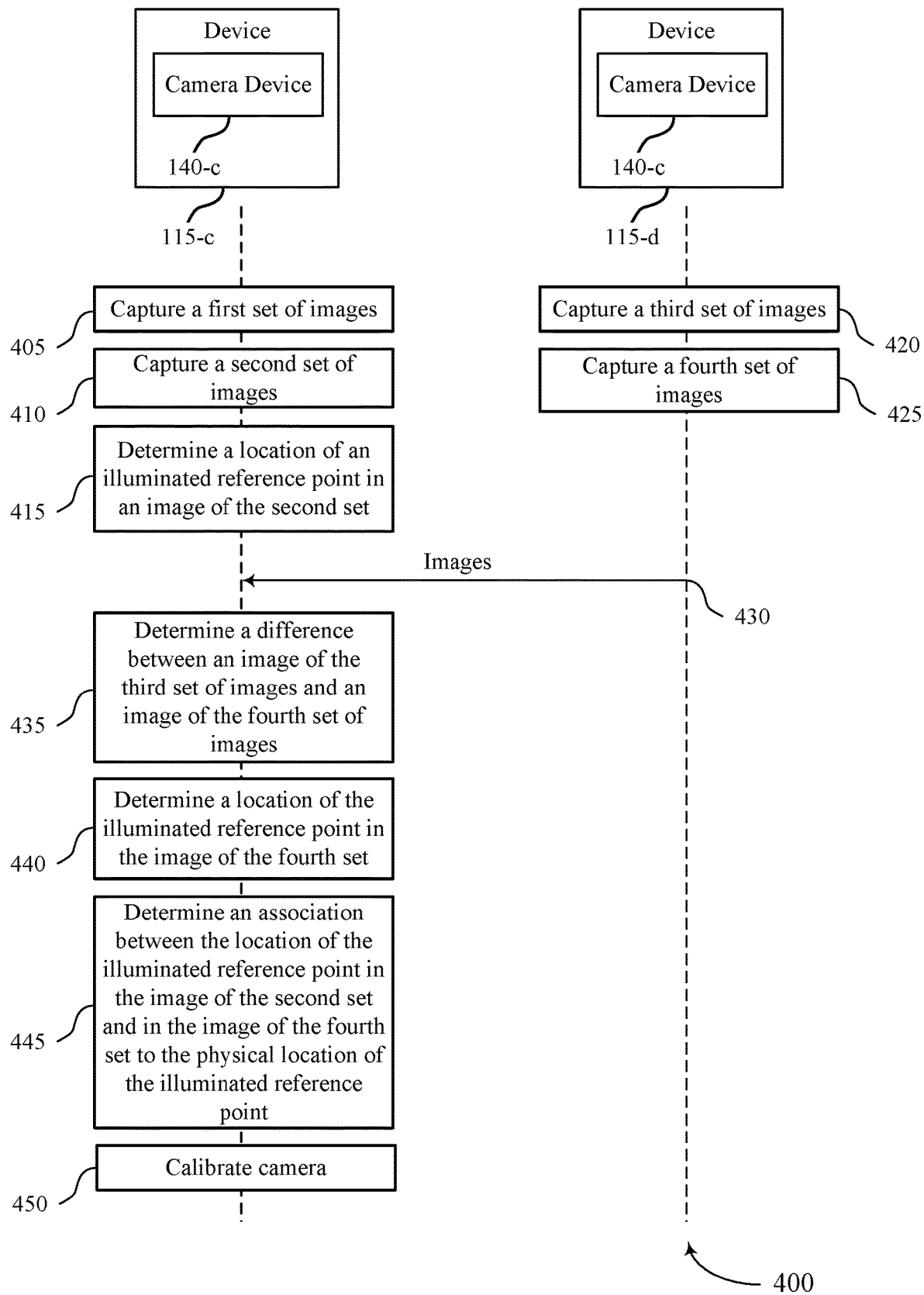
FIG. 4 illustrates an example of a process flow that supports camera calibration in accordance with aspects of the present disclosure.

FIG. 4 illustrates an example of a process flow 400 that supports camera calibration in accordance with aspects of the present disclosure. In some examples, the process flow 400 may implement aspects related to camera calibration as described herein. For example, the device 115-*c* including the camera device 140-*c* and the device 115-*d* including the camera device 140-*d* may be examples of the corresponding devices described with reference to FIG. 1. The device 115-*c* and the device 115-*d* may support multiple camera device cross-calibration.

In the following description of the process flow 400, the operations between the device 115-*c* and the device 115-*d* may be transmitted in a different order than the exemplary order shown, or the operations performed by the device 115-*c* and the device 115-*d* may be performed in different orders or at different times. Certain operations may also be left out of the process flow 400, or other operations may be added to the process flow 400.

At 405, the camera device 140-*c* of device 115-*c* may capture a first set of images of a physical environment. At 410, the camera device 140-*c* of device 115-*c* may a second set of images of the physical environment with at least some, if not all, of the second set of images of the physical environment having one or more illuminated reference points. The one or more illuminated reference points may be a self-emitting light source (e.g., LED).

At 415, the camera device 140-*c* of device 115-*c* may determine a location of the illuminated reference point in an image of the second set of images based at least in part on at least one image of the first set of images and at least one image of the second set of images.

At 420, the camera device 140-*d* of device 115-*d* may capture a third set of images of the physical environment. At 425, the camera device 140-*d* of device 115-*d* may capture a fourth set of images of the physical environment with at least some, if not all, of the second set of images of the physical environment having one or more illuminated reference points. An orientation of the camera device 140-*d* within the physical environment and relative to the one or more illuminated reference point may be different from an orientation of the camera device 140-*c* within the physical environment and relative to the one or more illuminated reference points.

For example, the camera device 140-*c* may have a first position (e.g., x, y, and z position) and a first orientation (e.g., angle, FOV), while the camera device 140-*d* may have a second position (e.g., x, y, and z position) and a second orientation (e.g., angle, FOV) different from the camera device 140-*c*.

At 430, the camera device 140-*d* of device 115-*d* may transmit the third set of images and the fourth set of images to the device 115-*c*. At 435, the camera device 140-*c* of device 115-*c* may determine a difference between an image of the third set of images and an image of the fourth set of images having the one or more illuminated reference points. At 440, the camera device 140-c of device 115-c may determine a location of the one or more illuminated reference points in the image of the fourth set of images based at least in part on the difference between an image of the third set of images and an image of the fourth set of images having the one or more illuminated reference points.

At 445, the camera device 140-c of device 115-c may determine an association between the location of the one or more illuminated reference points in the image of the second set of images and the location of the one or more illuminated reference points in the image of the fourth set of images to the physical location of the one or more illuminated reference points in the physical environment. At 450, the device 115-c may calibrate the camera device 140-c, for example based on the association.

In some cases, another device (e.g., excluding the camera device 140-c and/or the device 115-c) may perform the calibration (i.e., determine the set of intrinsic and/or extrinsic parameter values and provide it to the camera device 140-c and/or the device 115-c). In some examples, the device 115-c may determine a set of intrinsic and/or extrinsic parameter values of the camera device 140-c based at least in part on the first and third set of images of the physical environment and the second and fourth set of images of the physical environment having the one or more illuminated reference points, to calibrate the camera device 140-c.

As such, the device 115-c and the device 115-d may support multiple camera device cross-calibration. In some cases, the device 115-c and the device 115-d may capture images of the physical environment simultaneously to minimize interference from any time based effects, vibration, thermal expansion, etc.

Figure 5:
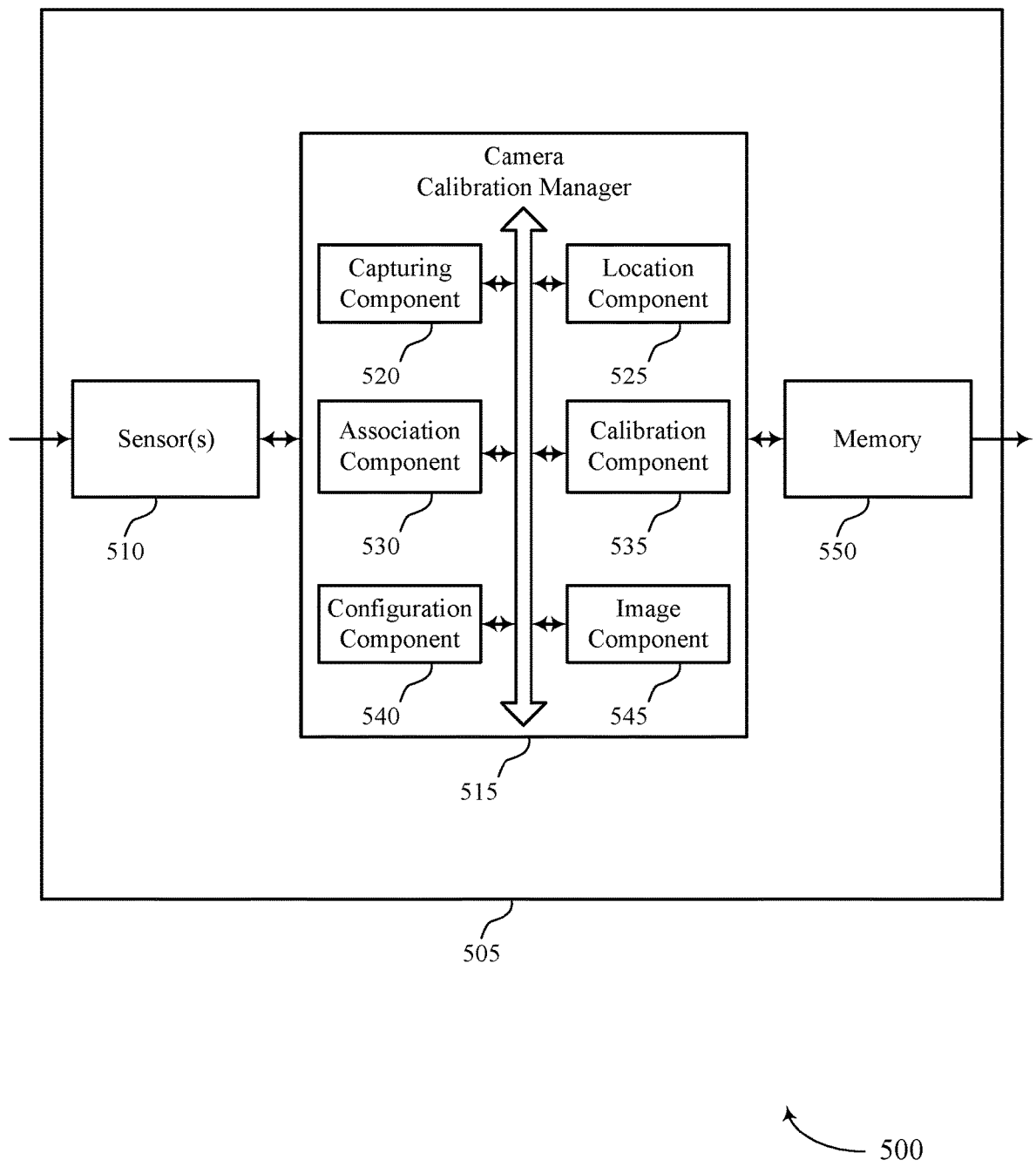
FIG. 5 shows a block diagram of a device that supports camera calibration in accordance with aspects of the present disclosure.

FIG. 5 shows a block diagram 500 of a device 505 that supports camera calibration in accordance with aspects of the present disclosure. The device 505 may be an example of aspects of a device as described herein. The device 505 may include sensor(s) 510, a camera calibration manager 515, and memory 550. The device 505 may also include a processor. Each of these components may be in communication with one another (e.g., via one or more buses).

The sensor(s) 510 may receive information such as packets, user data, or control information associated with various information channels (e.g., control channels, data channels, and information related to camera calibration, etc.). Information may be passed on to other components of the device 505. Sensor(s) 510 may be an example of an image sensor for capturing images. For example, sensor(s) 510 may represent a camera operable to capture an image of a scene that may be processed by camera calibration manager 515 alone according to aspects of the present disclosure. In another example, sensor(s) 510 may be an optical depth sensor (e.g., for determining or estimating a depth of an object or scene with respect to device 505), a lux sensor (e.g., for detecting an illumination condition, luminance levels), a motion sensor (e.g., for detecting motion associated with the scene), an infrared heat sensor (e.g., for detecting humans and animals vs. objects in the scene), among others. Sensor(s) 510 may, in some cases, be a charge coupled device (CCD) sensor or a complementary metal-oxide semiconductor (CMOS) sensor. The sensor(s) 510 may be an example of aspects of the transceiver 620 described with reference to FIG. 7. The sensor(s) 510 may utilize a single antenna or a set of antennas.

The camera calibration manager 515 may include a capturing component 520, a location component 525, an association component 530, a calibration component 535, a configuration component 540, and an image component 545. The camera calibration manager 515 may be an example of aspects of the camera calibration manager 610 described herein.

The camera calibration manager 515, or its sub-components, may be implemented in hardware, code (e.g., software or firmware) executed by a processor, or any combination thereof. If implemented in code executed by a processor, the functions of the camera calibration manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The camera calibration manager 515, or its sub-components, may be physically located at various positions, including being distributed such that portions of functions are implemented at different physical locations by one or more physical components. In some examples, the camera calibration manager 515, or its sub-components, may be a separate and distinct component in accordance with various aspects of the present disclosure.

In some examples, the camera calibration manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The capturing component 520 may capture a first set of images of a physical environment and capture a second set of images of the physical environment having an illuminated reference point. The location component 525 may determine a location of the illuminated reference point in an image of the second set of images based on an image of the first set of images and the image of the second set of images. In some examples, the location component 525 may determine a difference between the image of the first set of images and the image of the second set of images having the illuminated reference point, where determining the location of the illuminated reference point in the image of the second set of images is based on the difference.

In some examples, the location component 525 may identify the physical location of the illuminated reference point in the physical environment based on the configuration information. In some examples, the location component 525 may determine a difference between an image of the third set of images and an image of the fourth set of images having the illuminated reference point. In some examples, the location component 525 may determine a location of the illuminated reference point in the image of the fourth set of images based on the difference.

The association component 530 may determine an association between the location of the illuminated reference point in the image of the second set of images to a physical location of the illuminated reference point in the physical environment.

In some examples, the association component 530 may compare the location of the illuminated reference point in the image of the second set of images to the identified physical location of the illuminated reference point in the physical environment. In some examples, determining the association between the location of the illuminated reference point in the image of the second set of images to the physical location of the illuminated reference point in the physical environment is based on the comparing. In some examples, the association component 530 may determine an association between the location of the illuminated reference point in the image of the second set of images and the location of the illuminated reference point in the image of the fourth set of images to the physical location of the illuminated reference point in the physical environment. In some examples, calibrating the device 505 is based on the association.

The calibration component 535 may calibrate the device 505 based on the association. In some examples, the calibration component 535 may determine a set of intrinsic parameter values of the device 505 based on the first set of images of the physical environment and the second set of images of the physical environment having the illuminated reference point, where calibrating the device 505 is based on the set of intrinsic parameter values. In some examples, the calibration component 535 may determine a set of extrinsic parameter values of the device 505 based on the first set of images of the physical environment and the second set of images of the physical environment having the illuminated reference point, where calibrating the device 505 is based on the set of extrinsic parameter values.

The configuration component 540 may receive configuration information during a calibration procedure, where the configuration information includes at least one of: physical location information of a quantity of illuminated reference points in the physical environment and an illumination pattern of the quantity of illuminated reference points in the physical environment, or the quantity of illuminated reference points including the illuminated reference point, where capturing the first set of images and the second set of images is based on the configuration information.

In some examples, the configuration component 540 may identify the illumination pattern associated with the illuminated reference point and a quantity of other illuminated reference points in the physical environment based on the configuration information, the illuminated reference and the quantity of other illuminated reference points having varying depths and positions within the physical environment relative to the device 505, where capturing the first set of images and the second set of images is based on the illumination pattern.

In some examples, identifying a first time associated with an inactive state of the illuminated reference point and one or more of the other illuminated reference points in the physical environment based on the illumination pattern, where capturing the first set of images of the physical environment includes capturing the first set of images during the first time.

In some examples, identifying a second time associated with an active state of the illuminated reference point and one or more of the other illuminated reference points in the physical environment based on the illumination pattern, where capturing the second set of images of the physical environment includes capturing the second set of images during the second time different from the first time.

The image component 545 may receive, from a second camera device, a third set of images of the physical environment. In some examples, the image component 545 may receive, from the second camera device, a fourth set of images of the physical environment having the illuminated reference point, where an orientation of the second camera device within the physical environment and relative to the illuminated reference point is different from an orientation of the device 505 within the physical environment and relative to the illuminated reference point; and where calibrating the device 505 is based on the third set of images and the fourth set of images.

Memory 550 may include random access memory (RAM) and read only memory (ROM). The memory 550 may, additionally or alternatively, include static RAM (SRAM), dynamic RAM (DRAM), electrically erasable programmable read-only memory (EEPROM), compact disk-ROM (CD-ROM) or other optical disc storage, magnetic disc storage, or other magnetic storage devices, flash memory, or any other medium that can be used to store desired program code in the form of instructions or data structures and that can be accessed by a computer or a processor. The memory 550 may store computer-readable, computer-executable software including instructions that, when executed, cause the processor to perform various functions described herein. Memory 550 may store image data, configuration information (e.g., illumination pattern), among other information. In some cases, the memory 550 may contain, among other things, a basic input/output system (BIOS) which may control basic hardware or software operation such as the interaction with peripheral components or devices.

As detailed above, camera calibration manager 515 and/or one or more components of the camera calibration manager 515 may perform and/or be a means for performing, either alone or in combination with other elements, one or more operations for camera calibration.

Figure 6:
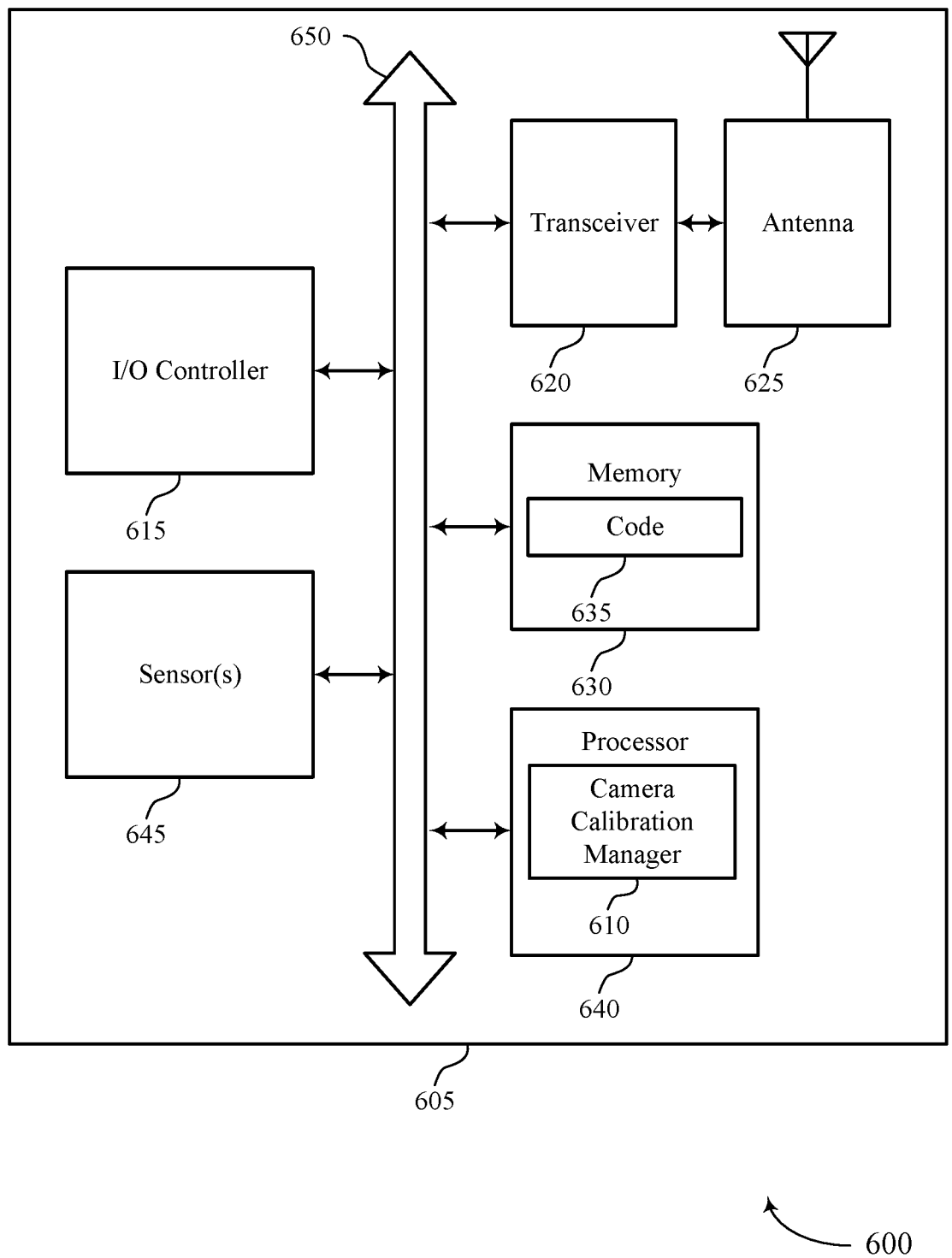
FIG. 6 shows a diagram of a system including a device that supports camera calibration in accordance with aspects of the present disclosure.

FIG. 6 shows a diagram of a system 600 including a device 605 that supports camera calibration in accordance with aspects of the present disclosure. The device 605 may be an example of or include the components of device 505, or a device as described herein. The device 605 may include components for bi-directional data communications including components for transmitting and receiving communications, including a camera calibration manager 610, an I/O controller 615, a transceiver 620, an antenna 625, memory 630, a processor 640, and sensor(s) 645. These components may be in electronic communication via one or more buses (e.g., bus 650).

The camera calibration manager 610 may capture, by the device 605, a first set of images of a physical environment, capture, by the device 605, a second set of images of the physical environment having an illuminated reference point, determine a location of the illuminated reference point in an image of the second set of images based on an image of the first set of images and the image of the second set of images, determine an association between the location of the illuminated reference point in the image of the second set of images to a physical location of the illuminated reference point in the physical environment, and calibrate the device 505 based on the association.

The I/O controller 615 may manage input and output signals for the device 605. The I/O controller 615 may also manage peripherals not integrated into the device 605. In some cases, the I/O controller 615 may represent a physical connection or port to an external peripheral. In some cases, the I/O controller 615 may utilize an operating system such as ios, android, ms-dos, ms-windows, os/x, unix, linux, or another known operating system. In other cases, the I/O controller 615 may represent or interact with a modem, a keyboard, a mouse, a touchscreen, or a similar device. For example, the I/O controller 615 may manage a display that may represent a unit capable of displaying calibration data, images, text or any other type of data for consumption by a viewer. The display may include a liquid-crystal display (LCD), a LED display, an organic LED (OLED), an active-matrix OLED (AMOLED), or the like. In some cases, the display and I/O controller 615 may be or represent aspects of a same component (e.g., a touchscreen) of device 605. In some cases, the I/O controller 615 may be implemented as part of a processor. In some cases, a user may interact with the device 605 via the I/O controller 615 or via hardware components controlled by the I/O controller 615.

The transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas. In some cases, the device 605 may include a single antenna 625. However, in some cases the device 605 may have more than one antenna 625, which may be capable of concurrently transmitting or receiving multiple wireless transmissions (e.g., images, video, configuration information).

The memory 630 may include RAM and ROM. The memory 630 may store computer-readable, computer-executable code 635 including instructions that, when executed, cause the processor to perform various functions described herein. In some cases, the memory 630 may contain, among other things, a BIOS which may control basic hardware or software operation such as the interaction with peripheral components or devices.

The processor 640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In other cases, a memory controller may be integrated into the processor 640. The processor 640 may be configured to execute computer-readable instructions stored in a memory (e.g., the memory 630) to cause the device 605 to perform various functions (e.g., functions or tasks supporting camera calibration).

The code 635 may include instructions to implement aspects of the present disclosure, including instructions to support calibrating a camera device (e.g., device 605). The code 635 may be stored in a non-transitory computer-readable medium such as system memory or other type of memory. In some cases, the code 635 may not be directly executable by the processor 640 but may cause a computer (e.g., when compiled and executed) to perform functions described herein.

Sensor(s) 645 may be an example of an image sensor for capturing images and video. For example, sensor(s) 645 may represent a camera operable to capture an image of a scene that may be processed by the camera calibration manager 610 alone or in combination with processor 640 according to aspects of the present disclosure. In another example, sensor(s) 645 may be an optical depth sensor, a lux sensor, a motion sensor, an infrared heat sensor, among others. In some examples, the device 605 may include more than one sensor. Sensor(s) 645 may also be configured with multiple functionalities. For example, a single sensor 645 may be capable to perform operations related to the image sensor, the optical depth sensor, the motion sensor, or the light sensor, or any combination thereof. Sensor(s) 645 may be a CCD sensor or a CMOS sensor.

As detailed above, camera calibration manager 610 and/or one or more components of the camera calibration manager 610 may perform and/or be a means for performing, either alone or in combination with other elements, one or more operations for camera calibration.

Figure 7:
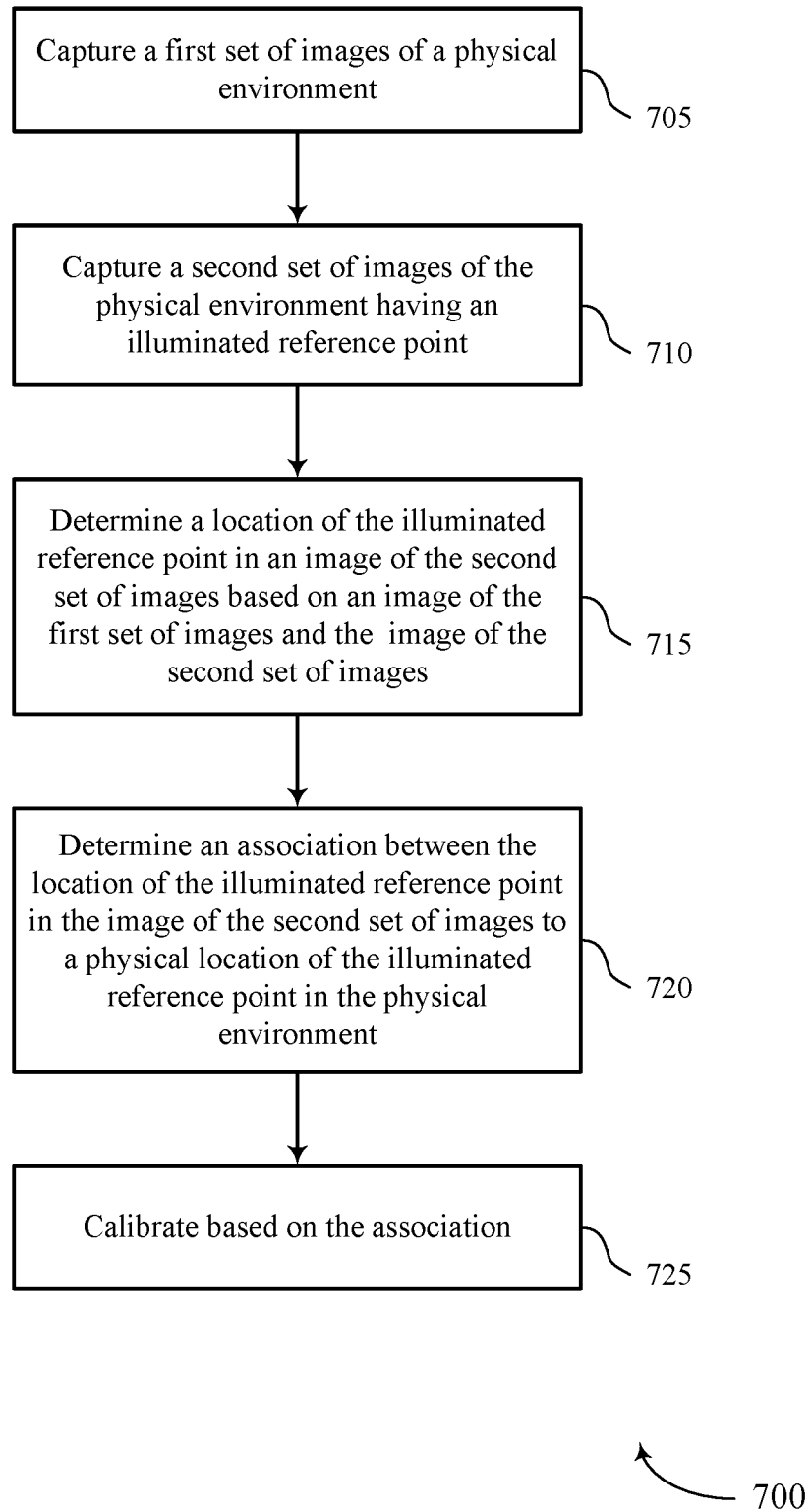
FIGS. 7 through 10 show flowcharts illustrating methods that support camera calibration in accordance with aspects of the present disclosure.

FIG. 7 shows a flowchart illustrating a method 800 that supports camera calibration in accordance with aspects of the present disclosure. The operations of method 800 may be implemented by a device or its components as described herein. For example, the operations of method 800 may be performed by a camera calibration manager as described with reference to FIGS. 5 and 6. In some examples, a device may execute a set of instructions to control the functional elements of the device to perform the functions described below. Additionally or alternatively, a device may perform aspects of the functions described below using special-purpose hardware.

At 805, the device may capture a first set of images of a physical environment. The operations of 805 may be performed according to the methods described herein. In some examples, aspects of the operations of 805 may be performed by a capturing component as described with reference to FIGS. 5 and 6.

At 810, the device may capture a second set of images of the physical environment having an illuminated reference point. The operations of 810 may be performed according to the methods described herein. In some examples, aspects of the operations of 810 may be performed by a capturing component as described with reference to FIGS. 5 and 6.

At 815, the device may determine a location of the illuminated reference point in an image of the second set of images based on an image of the first set of images and the image of the second set of images. The operations of 815 may be performed according to the methods described herein. In some examples, aspects of the operations of 815 may be performed by a location component as described with reference to FIGS. 5 and 6.

At 820, the device may determine an association between the location of the illuminated reference point in the image of the second set of images to a physical location of the illuminated reference point in the physical environment. The operations of 820 may be performed according to the methods described herein. In some examples, aspects of the operations of 820 may be performed by an association component as described with reference to FIGS. 5 and 6.

At 825, the device may calibrate based on the association. The operations of 825 may be performed according to the methods described herein. In some examples, aspects of the operations of 825 may be performed by a calibration component as described with reference to FIGS. 5 and 6.

Figure 8:
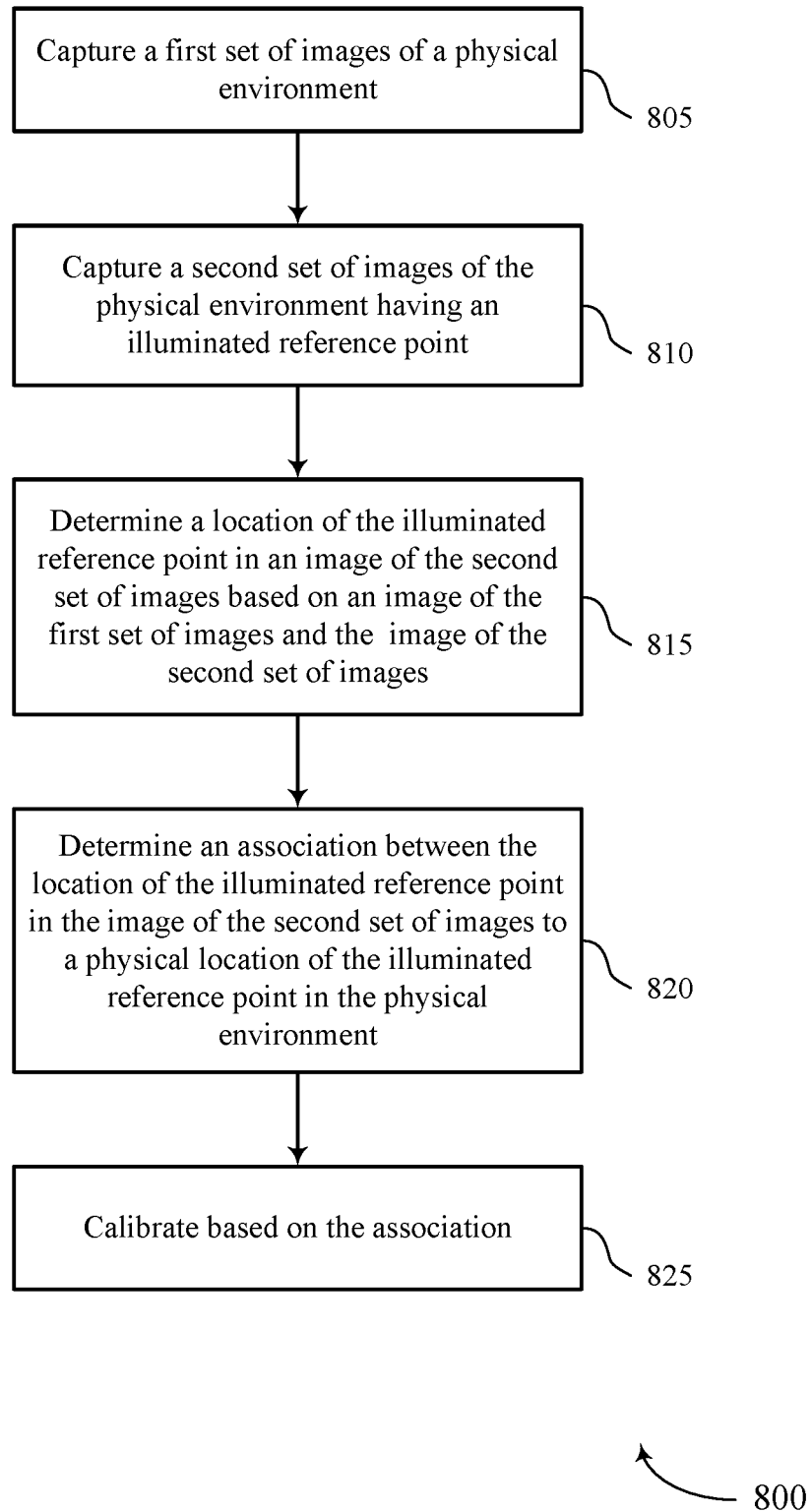

FIG. 8 shows a flowchart illustrating a method 800 that supports camera calibration in accordance with aspects of the present disclosure. The operations of method 800 may be implemented by a device or its components as described herein. For example, the operations of method 800 may be performed by a camera calibration manager as described with reference to FIGS. 5 and 6. In some examples, a device may execute a set of instructions to control the functional elements of the device to perform the functions described below. Additionally or alternatively, a device may perform aspects of the functions described below using special-purpose hardware.

At 805, the device may capture a first set of images of a physical environment. The operations of 805 may be performed according to the methods described herein. In some examples, aspects of the operations of 805 may be performed by a capturing component as described with reference to FIGS. 5 and 6.

At 810, the device may capture a second set of images of the physical environment having an illuminated reference point. The operations of 810 may be performed according to the methods described herein. In some examples, aspects of the operations of 810 may be performed by a capturing component as described with reference to FIGS. 5 and 6.

At 815, the device may determine a location of the illuminated reference point in an image of the second set of images based on an image of the first set of images and the image of the second set of images. The operations of 815 may be performed according to the methods described herein. In some examples, aspects of the operations of 815 may be performed by a location component as described with reference to FIGS. 5 and 6.

At 820, the device may determine an association between the location of the illuminated reference point in the image of the second set of images to a physical location of the illuminated reference point in the physical environment. The operations of 820 may be performed according to the methods described herein. In some examples, aspects of the operations of 820 may be performed by an association component as described with reference to FIGS. 5 and 6.

At 825, the device may calibrate based on the association. The operations of 825 may be performed according to the methods described herein. In some examples, aspects of the operations of 825 may be performed by a calibration component as described with reference to FIGS. 5 and 6.

Figure 9:
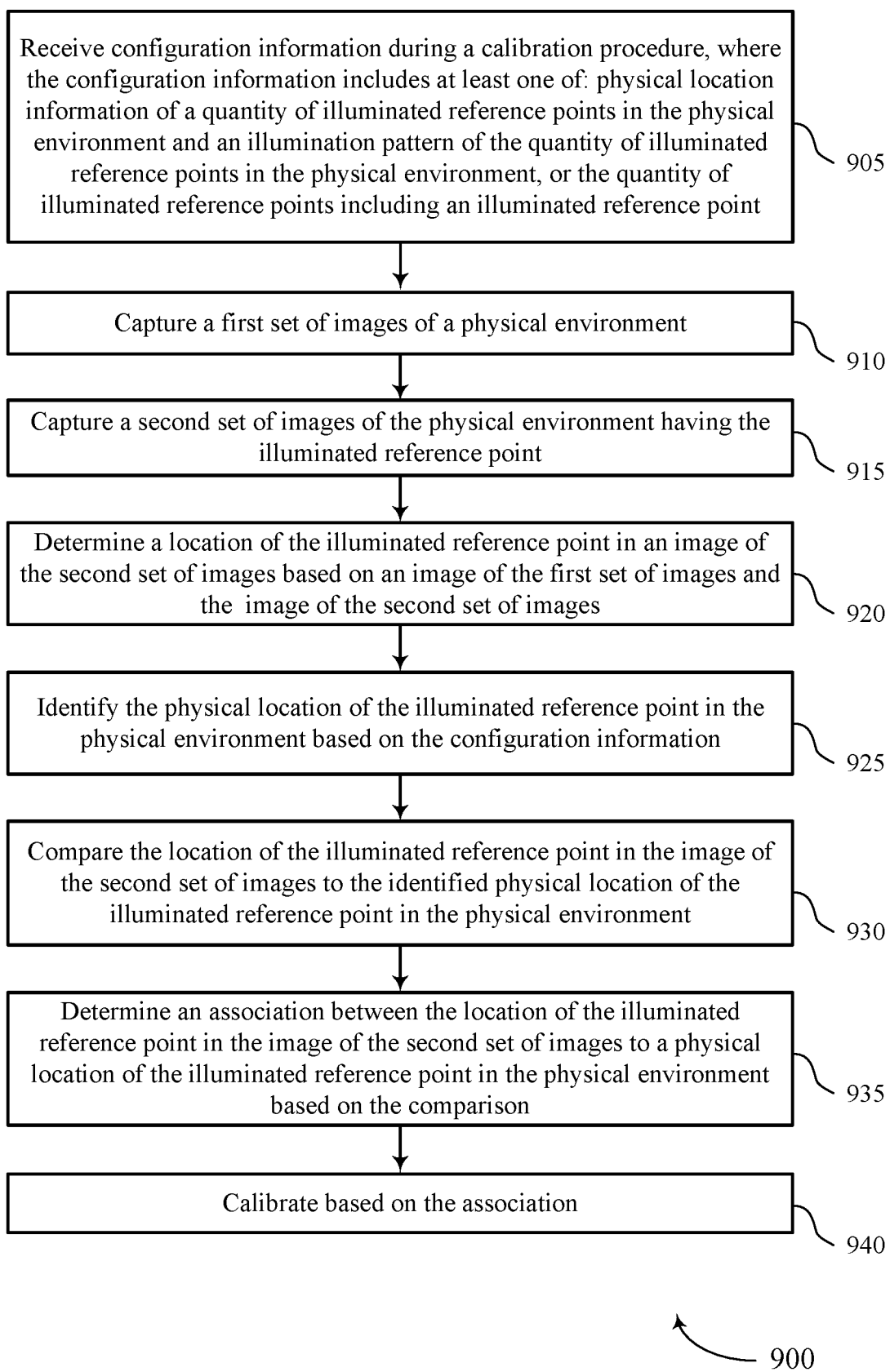

FIG. 9 shows a flowchart illustrating a method 900 that supports camera calibration in accordance with aspects of the present disclosure. The operations of method 900 may be implemented by a device or its components as described herein. For example, the operations of method 900 may be performed by a camera calibration manager as described with reference to FIGS. 5 and 6. In some examples, a device may execute a set of instructions to control the functional elements of the device to perform the functions described below. Additionally or alternatively, a device may perform aspects of the functions described below using special-purpose hardware.

At 905, the device may receive configuration information during a calibration procedure, where the configuration information includes at least one of: physical location information of a quantity of illuminated reference points in a physical environment and an illumination pattern of the quantity of illuminated reference points in the physical environment, or the quantity of illuminated reference points including an illuminated reference point. The operations of 905 may be performed according to the methods described herein. In some examples, aspects of the operations of 905 may be performed by a configuration component as described with reference to FIGS. 5 and 6.

At 910, the device may capture a first set of images of a physical environment. For example, the device may capture the first set of images of the physical environment based on the configuration information. The operations of 910 may be performed according to the methods described herein. In some examples, aspects of the operations of 910 may be performed by a capturing component as described with reference to FIGS. 5 and 6.

At 915, the device may capture a second set of images of the physical environment having the illuminated reference point. The operations of 915 may be performed according to the methods described herein. In some examples, aspects of the operations of 915 may be performed by a capturing component as described with reference to FIGS. 5 and 6.

At 920, the device may determine a location of the illuminated reference point in an image of the second set of images based on an image of the first set of images and the image of the second set of images. The operations of 920 may be performed according to the methods described herein. In some examples, aspects of the operations of 920 may be performed by a location component as described with reference to FIGS. 5 and 6.

At 925, the device may identify the physical location of the illuminated reference point in the physical environment based on the configuration information. The operations of 925 may be performed according to the methods described herein. In some examples, aspects of the operations of 925 may be performed by a location component as described with reference to FIGS. 5 and 6.

At 930, the device may compare the location of the illuminated reference point in the image of the second set of images to the identified physical location of the illuminated reference point in the physical environment. The operations of 930 may be performed according to the methods described herein. In some examples, aspects of the operations of 930 may be performed by an association component as described with reference to FIGS. 5 and 6.

At 935, the device may determine an association between the location of the illuminated reference point in the image of the second set of images to a physical location of the illuminated reference point in the physical environment based on the comparison. The operations of 935 may be performed according to the methods described herein. In some examples, aspects of the operations of 935 may be performed by an association component as described with reference to FIGS. 5 and 6.

At 940, the device may calibrate based on the association. The operations of 940 may be performed according to the methods described herein. In some examples, aspects of the operations of 940 may be performed by a calibration component as described with reference to FIGS. 5 and 6.

Figure 10:
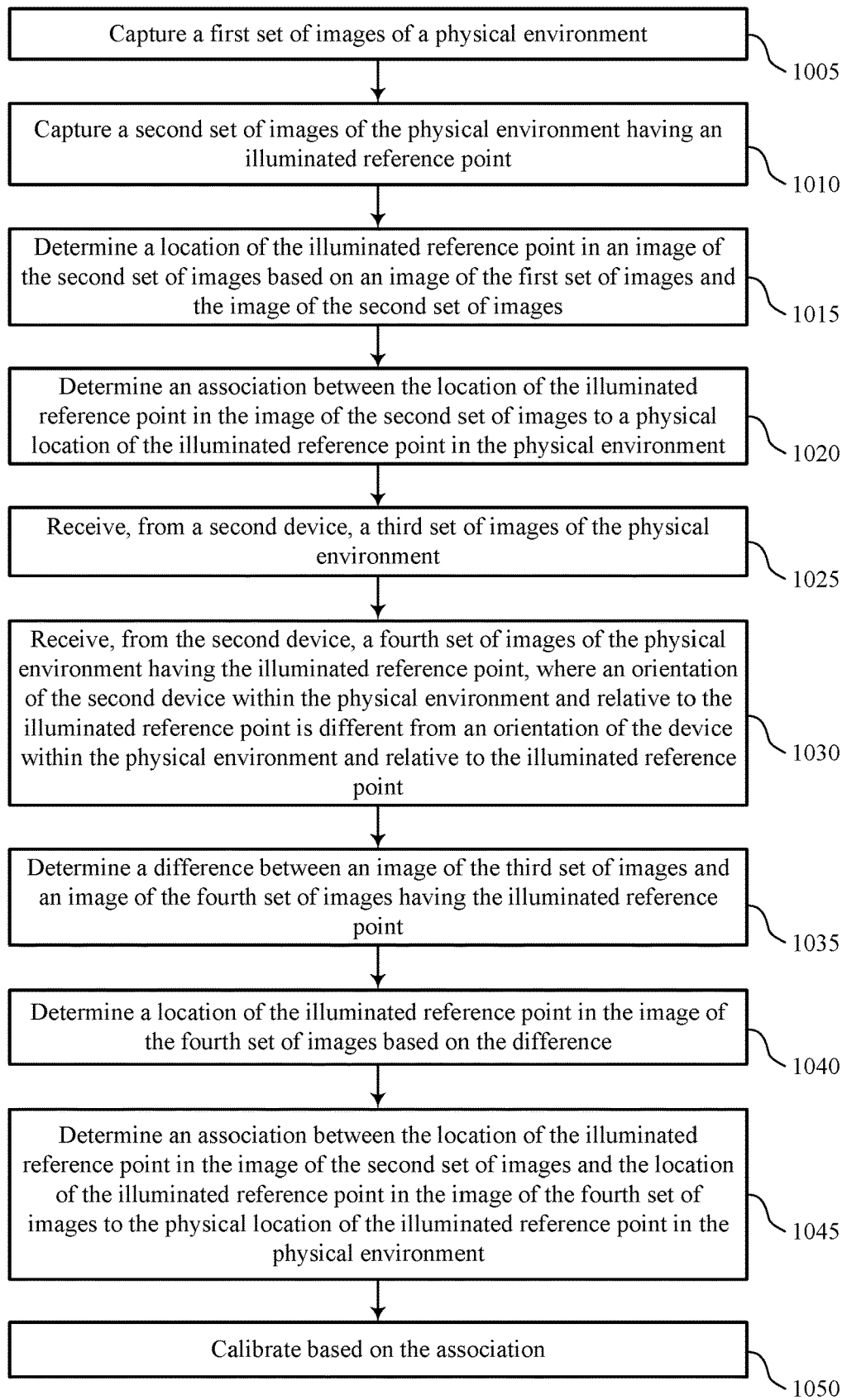

FIG. 10 shows a flowchart illustrating a method 1000 that supports camera calibration in accordance with aspects of the present disclosure. The operations of method 1000 may be implemented by a device or its components as described herein. For example, the operations of method 1000 may be performed by a camera calibration manager as described with reference to FIGS. 5 and 6. In some examples, a device may execute a set of instructions to control the functional elements of the device to perform the functions described below. Additionally or alternatively, a device may perform aspects of the functions described below using special-purpose hardware.

At 1005, the device may capture a first set of images of a physical environment. The operations of 1005 may be performed according to the methods described herein. In some examples, aspects of the operations of 1005 may be performed by a capturing component as described with reference to FIGS. 5 and 6.

At 1010, the device may capture a second set of images of the physical environment having an illuminated reference point. The operations of 1010 may be performed according to the methods described herein. In some examples, aspects of the operations of 1010 may be performed by a capturing component as described with reference to FIGS. 5 and 6.

At 1015, the device may determine a location of the illuminated reference point in an image of the second set of images based on an image of the first set of images and the image of the second set of images. The operations of 1015 may be performed according to the methods described herein. In some examples, aspects of the operations of 1015 may be performed by a location component as described with reference to FIGS. 5 and 6.

At 1020, the device may determine an association between the location of the illuminated reference point in the image of the second set of images to a physical location of the illuminated reference point in the physical environment. The operations of 1020 may be performed according to the methods described herein. In some examples, aspects of the operations of 1020 may be performed by an association component as described with reference to FIGS. 5 and 6.

At 1025, the device may receive, from a second device, a third set of images of the physical environment. The operations of 1025 may be performed according to the methods described herein. In some examples, aspects of the operations of 1025 may be performed by an image component as described with reference to FIGS. 5 and 6.

At 1030, the device may receive, from the second device, a fourth set of images of the physical environment having the illuminated reference point, where an orientation of the second device within the physical environment and relative to the illuminated reference point is different from an orientation of the device within the physical environment and relative to the illuminated reference point. The operations of 1030 may be performed according to the methods described herein. In some examples, aspects of the operations of 1030 may be performed by an image component as described with reference to FIGS. 5 and 6.

At 1035, the device may determine a difference between an image of the third set of images and an image of the fourth set of images having the illuminated reference point. The operations of 1035 may be performed according to the methods described herein. In some examples, aspects of the operations of 1035 may be performed by a location component as described with reference to FIGS. 5 and 6.

At 1040, the device may determine a location of the illuminated reference point in the image of the fourth set of images based on the difference. The operations of 1040 may be performed according to the methods described herein. In some examples, aspects of the operations of 1040 may be performed by a location component as described with reference to FIGS. 5 and 6.

At 1045, the device may determine an association between the location of the illuminated reference point in the image of the second set of images and the location of the illuminated reference point in the image of the fourth set of images to the physical location of the illuminated reference point in the physical environment. The operations of 1045 may be performed according to the methods described herein. In some examples, aspects of the operations of 1045 may be performed by an association component as described with reference to FIGS. 5 and 6.

At 1050, the device may calibrate based on the association. The operations of 1050 may be performed according to the methods described herein. In some examples, aspects of the operations of 1050 may be performed by a calibration component as described with reference to FIGS. 5 and 6.

It should be noted that the methods described herein describe possible implementations, and that the operations and the steps may be rearranged or otherwise modified and that other implementations are possible. Further, aspects from two or more of the methods may be combined.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for calibrating a camera device, comprising:
   receiving configuration information during a calibration procedure, wherein the configuration information comprises at least one of: physical location information of a quantity of illuminated reference points in the physical environment and an illumination pattern of the quantity of illuminated reference points in the physical environment, or the quantity of illuminated reference points comprising an illuminated reference point;
   identifying the illumination pattern associated with the illuminated reference point and a quantity of other illuminated reference points in the physical environment based at least in part on the configuration information, the illuminated reference point and the quantity of other illuminated reference points having varying depths and positions within the physical environment relative to the camera device;
   capturing, by the camera device, a first set of images of a physical environment based at least in part on the configuration information and the illumination pattern;
   capturing, by the camera device, a second set of images of the physical environment having the illuminated reference point, based at least in part on the configuration information and the illumination pattern;
   determining a location of the illuminated reference point in an image of the second set of images based at least in part on an image of the first set of images and the image of the second set of images;
   determining an association between the location of the illuminated reference point in the image of the second set of images to a physical location of the illuminated reference point in the physical environment; and
   calibrating the camera device based at least in part on the association.

2. The method of claim 1, further comprising:
   determining a set of intrinsic parameter values of the camera device based at least in part on the first set of images of the physical environment and the second set of images of the physical environment having the illuminated reference point, wherein calibrating the camera device is based at least in part on the set of intrinsic parameter values.

3. The method of claim 2, wherein the set of intrinsic parameter values comprises at least one of a focal length associated with the camera device, a principal point associated with the camera device, a skew coefficient associated with the camera device, or a distortion associated with the camera device.

4. The method of claim 1, further comprising:
   determining a set of extrinsic parameter values of the camera device based at least in part on the first set of images of the physical environment and the second set of images of the physical environment having the illuminated reference point, wherein calibrating the camera device is based at least in part on the set of extrinsic parameter values.

5. The method of claim 4, wherein the set of extrinsic parameter values comprises at least one of a rotation associated with a reference frame for the camera device, or a translation associated with the reference frame for the camera device.

6. The method of claim 1, wherein the illuminated reference point is a self-emitting light source.

7. The method of claim 1, further comprising:
   determining a difference between the image of the first set of images and the image of the second set of images having the illuminated reference point, wherein determining the location of the illuminated reference point in the image of the second set of images is based at least in part on the difference.

8. The method of claim 1, wherein the quantity of illuminated reference points in the physical environment form a multi-dimensional target, wherein calibrating the camera device is based at least in part on the multi-dimensional target formed by the quantity of illuminated reference points in the physical environment comprising the illuminated reference point.

9. The method of claim 1, further comprising:
   identifying the physical location of the illuminated reference point in the physical environment based at least in part on the configuration information; and
   comparing the location of the illuminated reference point in the image of the second set of images to the identified physical location of the illuminated reference point in the physical environment, wherein determining the association between the location of the illuminated reference point in the image of the second set of images to the physical location of the illuminated reference point in the physical environment is based at least in part on the comparing.

10. The method of claim 1, further comprising:
    identifying a first time associated with an inactive state of the illuminated reference point and one or more of the other illuminated reference points in the physical environment based at least in part on the illumination pattern, wherein capturing the first set of images of the physical environment comprises capturing the first set of images during the first time.

11. The method of claim 10, further comprising:
    identifying a second time associated with an active state of the illuminated reference point and one or more of the other illuminated reference points in the physical environment based at least in part on the illumination pattern, wherein capturing the second set of images of the physical environment comprises capturing the second set of images during the second time different from the first time.

12. The method of claim 1, further comprising:
receiving, from a second camera device, a third set of images of the physical environment; and
receiving, from the second camera device, a fourth set of images of the physical environment having the illuminated reference point, wherein an orientation of the second camera device within the physical environment and relative to the illuminated reference point is different from an orientation of the camera device within the physical environment and relative to the illuminated reference point; and wherein calibrating the camera device is based at least in part on the third set of images and the fourth set of images.

13. The method of claim 12, further comprising:
determining a difference between an image of the third set of images and an image of the fourth set of images having the illuminated reference point;
determining a location of the illuminated reference point in the image of the fourth set of images based at least in part on the difference; and
determining an association between the location of the illuminated reference point in the image of the second set of images and the location of the illuminated reference point in the image of the fourth set of images to the physical location of the illuminated reference point in the physical environment, wherein calibrating the camera device is based at least in part on the association.

14. An apparatus, comprising:
a processor,
memory in electronic communication with the processor; and
instructions stored in the memory and executable by the processor to cause the apparatus to:
receive, by the apparatus, configuration information during a calibration procedure, wherein the configuration information comprises at least one of: physical location information of a quantity of illuminated reference points in the physical environment and an illumination pattern of the quantity of illuminated reference points in the physical environment, or the quantity of illuminated reference points comprising an illuminated reference point;
identify, by the apparatus, the illumination pattern associated with the illuminated reference point and a quantity of other illuminated reference points in the physical environment based at least in part on the configuration information, the illuminated reference point and the quantity of other illuminated reference points having varying depths and positions within the physical environment relative to the apparatus;
capture, by the apparatus, a first set of images of a physical environment based at least in part the configuration information and the illumination pattern;
capture, by the apparatus, a second set of images of the physical environment having the illuminated reference point based at least in part on the configuration information and the illumination pattern;
determine a location of the illuminated reference point in an image of the second set of images based at least in part on an image of the first set of images and the image of the second set of images;
determine an association between the location of the illuminated reference point in the image of the second set of images to a physical location of the illuminated reference point in the physical environment; and
calibrate the apparatus based at least in part on the association.

15. The apparatus of claim 14, wherein the instructions are further executable by the processor to cause the apparatus to:
determine a set of intrinsic parameter values of the camera device based at least in part on the first set of images of the physical environment and the second set of images of the physical environment having the illuminated reference point, wherein calibrating the camera device is based at least in part on the set of intrinsic parameter values.

16. The apparatus of claim 14, the set of intrinsic parameter values comprises at least one of a focal length associated with the camera device, a principal point associated with the camera device, a skew coefficient associated with the camera device, or a distortion associated with the camera device.

17. The apparatus of claim 14, wherein the instructions are further executable by the processor to cause the apparatus to:
determine a set of extrinsic parameter values of the camera device based at least in part on the first set of images of the physical environment and the second set of images of the physical environment having the illuminated reference point, wherein calibrating the camera device is based at least in part on the set of extrinsic parameter values.

18. An apparatus, comprising:
means for receiving, by the apparatus, configuration information during a calibration procedure, wherein the configuration information comprises at least one of: physical location information of a quantity of illuminated reference points in the physical environment and an illumination pattern of the quantity of illuminated reference points in the physical environment, or the quantity of illuminated reference points comprising an illuminated reference point;
means for identifying, by the apparatus, the illumination pattern associated with the illuminated reference point and a quantity of other illuminated reference points in the physical environment based at least in part on the configuration information, the illuminated reference point and the quantity of other illuminated reference points having varying depths and positions within the physical environment relative to the apparatus;
means for capturing, by the apparatus, a first set of images of a physical environment based at least in part on the configuration information and the illumination pattern;
means for capturing, by the apparatus, a second set of images of the physical environment having the illuminated reference point, based at least in part on the configuration information and the illumination pattern;
means for determining a location of the illuminated reference point in an image of the second set of images based at least in part on an image of the first set of images and the image of the second set of images;
means for determining an association between the location of the illuminated reference point in the image of the second set of images to a physical location of the illuminated reference point in the physical environment; and means for calibrating the apparatus based at least in part on the association.

\* \* \* \* \*